June 25, 1929.    M. W. ELMENDORF ET AL    1,718,223
TRANSMISSION MECHANISM
Filed Sept. 22, 1925    4 Sheets-Sheet 4

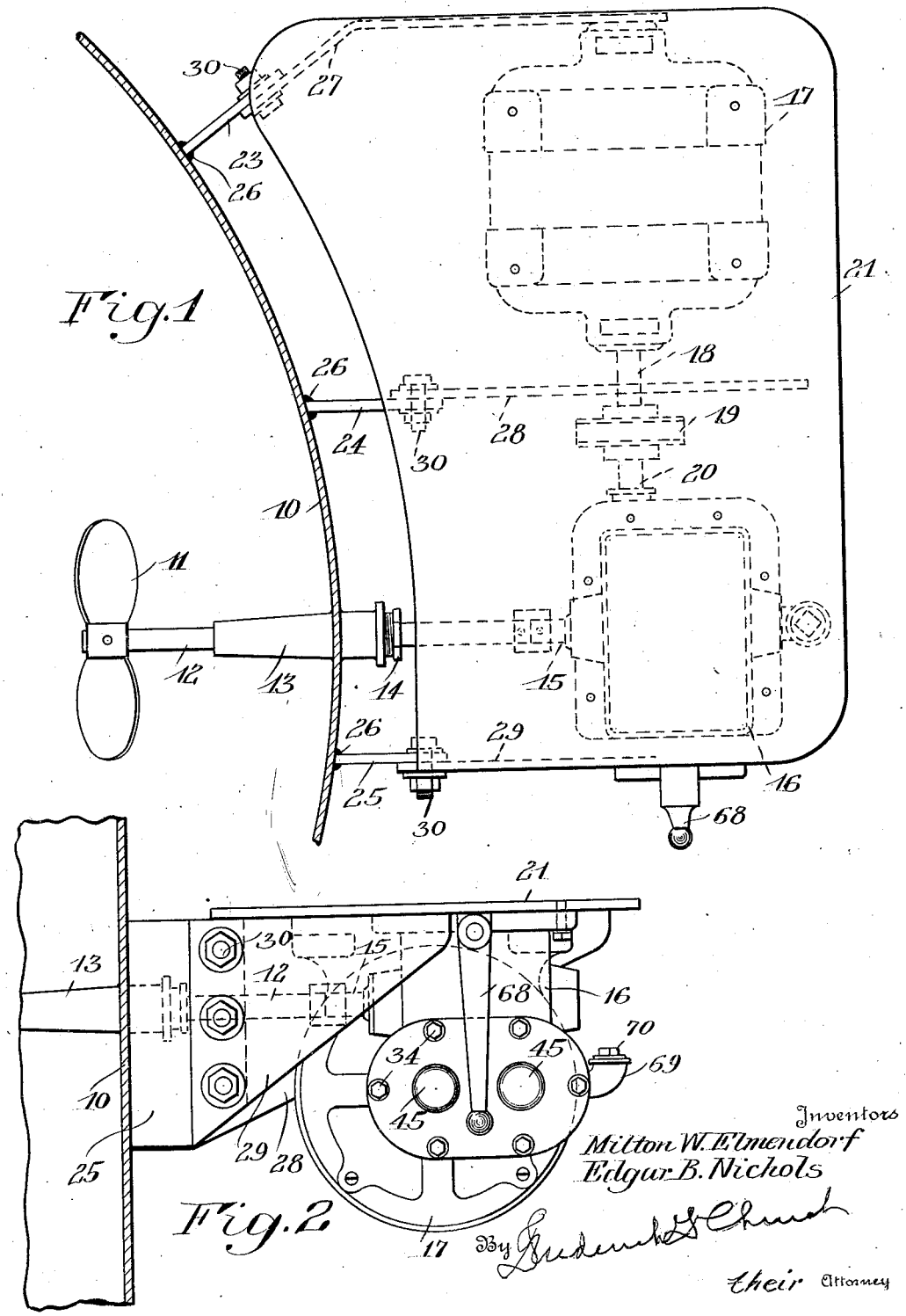

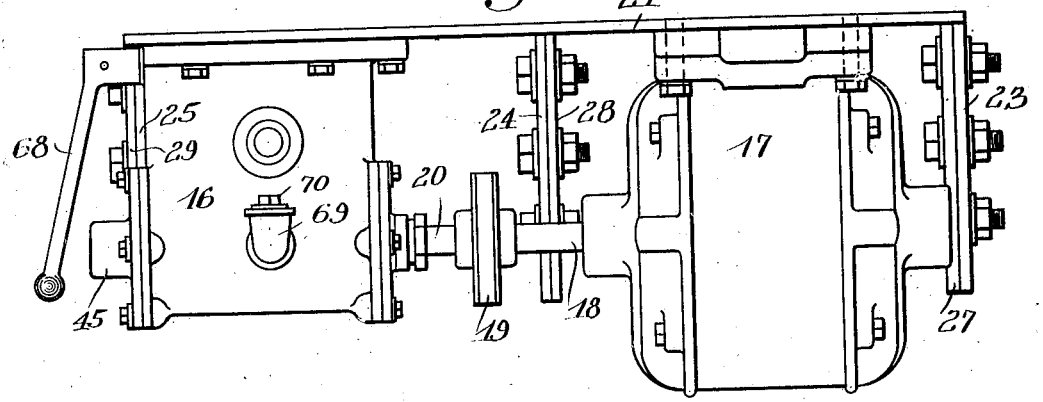
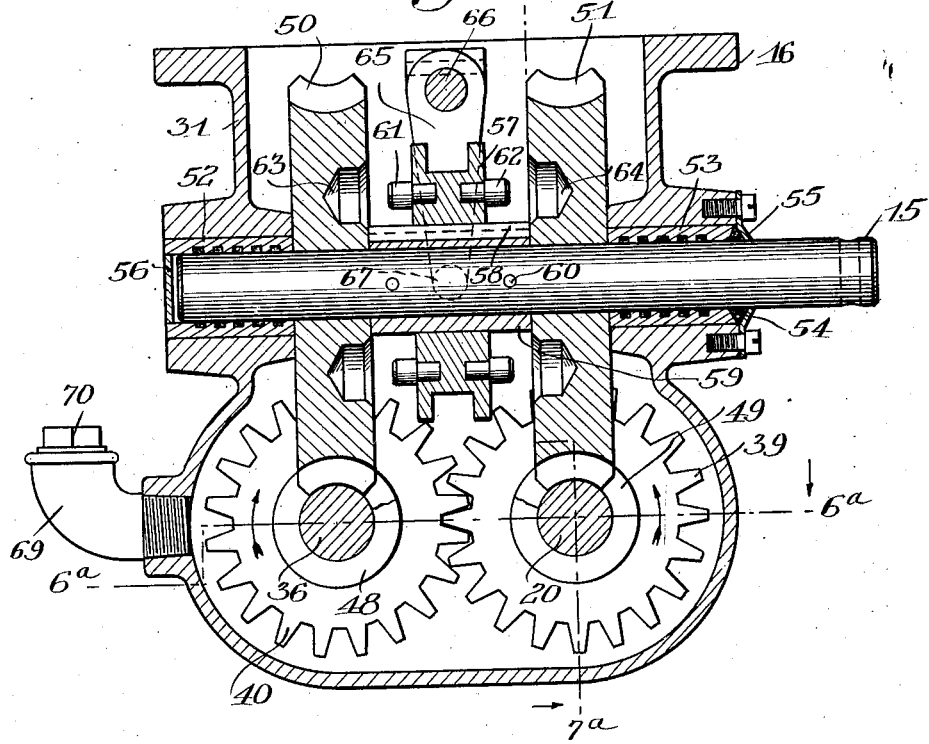

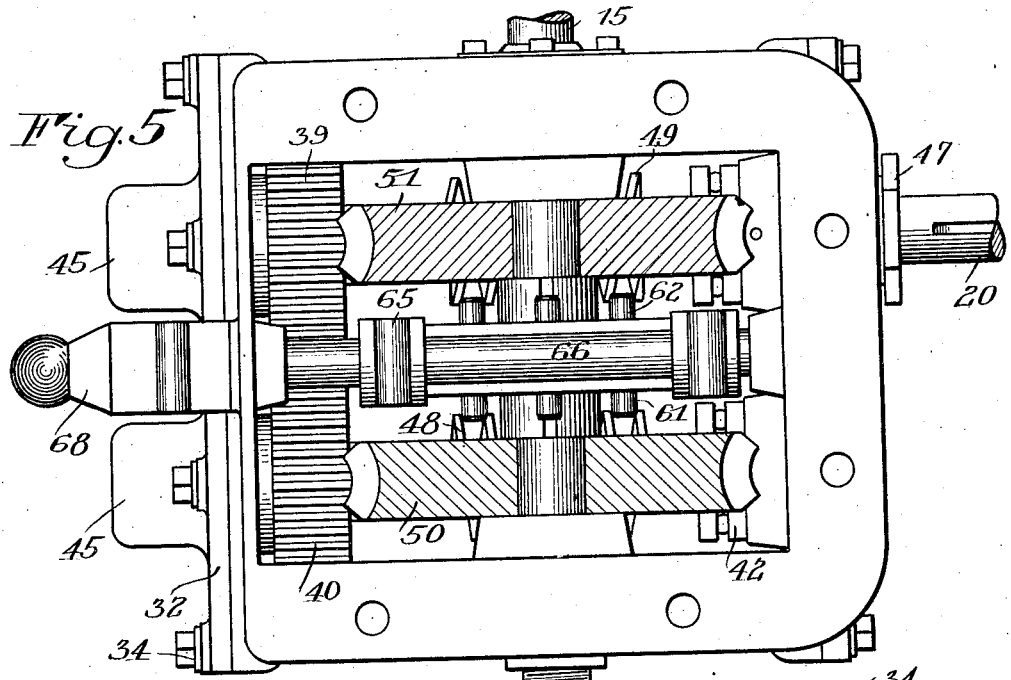
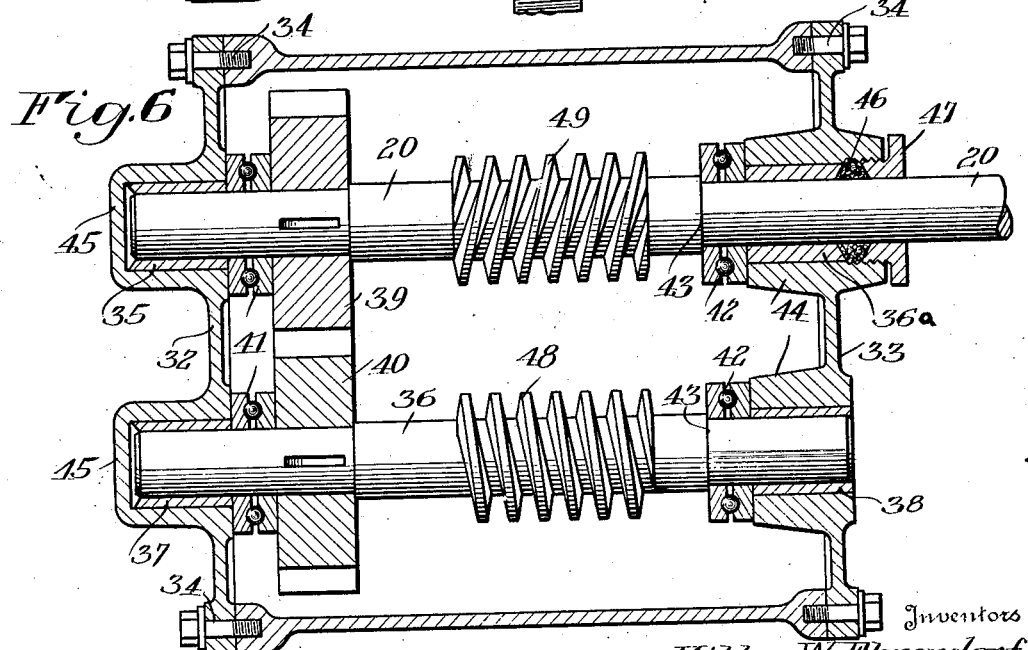

Inventors
Milton W. Elmendorf
Edgar B. Nichols
their Attorney

Patented June 25, 1929.

1,718,223

UNITED STATES PATENT OFFICE.

MILTON W. ELMENDORF AND EDGAR B. NICHOLS, OF ROCHESTER, NEW YORK, ASSIGNORS TO THE PFAUDLER COMPANY, OF ROCHESTER, NEW YORK, A CORPORATION OF NEW YORK.

TRANSMISSION MECHANISM.

Application filed September 22, 1925. Serial No. 57,828.

The present invention relates to a transmission mechanism and has for its object to provide an improved, compact, multiple speed transmission unit adapted to be coupled with a relatively high speed power unit and to selectively drive a work shaft at relatively low speeds, according to the nature of the work to be done.

A further object of the invention is to provide a simple efficient and economical form of change speed mechanism which can be readily operated by persons other than trained mechanics and one permitting the speed to be changed under load without injury to the machine.

A further object of the invention is to provide, in connection with a liquid processing tank having an impeller therein, a change speed drive mechanism with improved supporting means therefor connected with the tank in such a manner as to afford a substantially noiseless construction by reducing to a minimum the amount of vibration set up in the tank through the operation of the impeller drive mechanism.

To these and other ends the invention resides in certain improvements and combinations of parts, all as will be hereinafter more fully described, the novel features being pointed out in the claims at the end of the specification.

In the drawings:—

Figure 1 is a fragmentary sectional plan illustrating one embodiment of the invention;

Figure 2 is a side elevation showing a portion of the tank in section;

Figure 3 is a front elevation of the transmission and motor for driving the same.

Figure 4 is a transverse sectional elevation through the transmission drawn to an enlarged scale;

Figure 5 is a top plan view of the transmission with certain parts shown in section;

Figure 6 is a horizontal section taken on line 6ª—6ª of Figure 4.

Similar reference numerals throughout the several views indicate the same parts.

Figure 8:
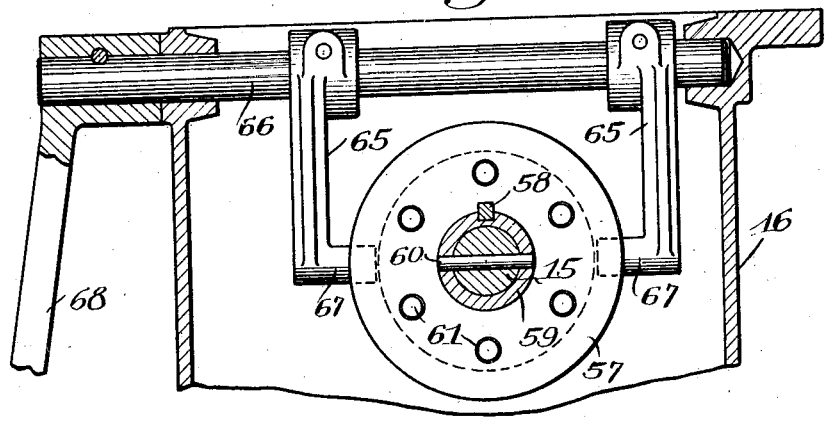
Figure 8 is a fragmentary sectional elevation illustrating the clutch operating means shown in plan in Figure 5.

The present invention is designed especially for use in connection with the processing of liquids, as in the case of dairy, icecream and chemical industries but is not limited to these particular usages. It comprehends both an improved, highly efficient motor driven transmission and an improved mounting for the same whereby to reduce the chances of injuring the enamel coatings of the tanks as well as to reduce the noise and vibration usually present in systems of this kind. Heretofore the driving means for the agitator has been mounted on the tank in such manner as to tend to increase, rather than reduce the noise and vibration incident to the thin shell construction of the tanks employed in the processing of the liquids. By reason of the particular construction shown and described herein these objections have been overcome.

In the pasteurizing of milk or the processing of other liquids, where the liquid in the tank cannot be maintained at a constant level or where the density varies several speeds for the impeller or agitator are necessary. The problem has been to provide a change speed mechanism for driving the agitator which can be readily employed with a relatively high speed motor to give the desired reductions, allowing a quick change from one speed to another during the operation of the machine. By way of example, the present invention permits reduction from a normal motor speed of 1750 R. P. M. down to 50, or more or less, as desired.

Referring to the drawings, 10 represents a portion of a liquid holding tank in which is disposed an impeller or agitator 11 on a shaft 12 journaled in a relatively long sleeve bearing 13 extending on both sides of the tank wall and having a packing nut 14 for compressing a suitable packing within the sleeve, not shown, whereby to afford a liquid tight joint around the shaft. Removably coupled with the shaft 13 is a drive shaft 15 of the improved transmission 16 indicated by dotted lines in Figure 1. The transmission is adapted to be driven preferably by an electric motor 17, having its shaft 18 connected by a flexible coupling 19 with the transmission shaft 20, as shown in Figures 1 and 3. Both the motor and the transmission are supported by a platform plate 21 being securely connected with the underside thereof by bolts or screws as desired. A plurality of arms 23, 24 and 25 comprising vertically disposed plate members each has its inner end abutting the outer face of the tank and connected therewith, preferably by welding as indicated at 26 in the Figure 1. Extensions 27, 28 and 29 are carried respectively by the arms 23, 24 and 25, being removably connected therewith, each by means of a suitable number of bolts 30 as shown. The platform plate is disposed upon the top edges of the extensions and is preferably connected therewith by welding so that the plate and extensions form a rigid unitary structure, the plate terminating short of the tank and thus not being capable of transmitting vibration directly to the same. By constructing and disposing the arms in the particular manner shown, whereby the contacting area of each with the tank is reduced to a minimum, they will transmit a minimum amount of vibration to the tank wall, thus affording a construction which is substantially free from noise. The vibrations are further minimized by reason of the joints between the arm and the extensions, afforded by bolting the extensions to the arms in contradistinction to the more rigid construction of making the entire arm in one piece.

Figure 7:
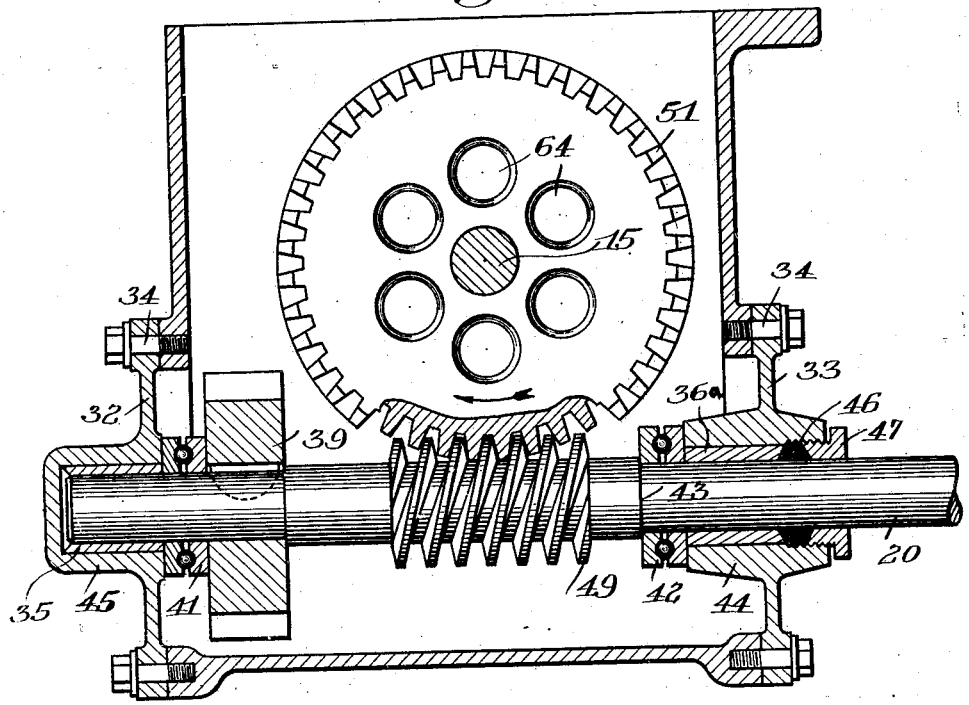
Figure 7 is a sectional elevation taken on line 7ª—7ª of Figure 4.

The transmission illustrated in Figures 4 to 8, inclusive, is disposed in a liquid tight casing 31 closed at its top by the platform 21 and having removable end sections 32 and 33 secured each by a suitable number of bolts 34, said sections being adapted to support certain of the driving parts of the mechanism as will be hereinafter pointed out. The main transmission drive shaft 20 is journaled in suitable bearings 35 and 36ᵃ carried respectively by the end closure sections 32 and 33 of the casing, as shown in Figure 6. A second transmission shaft 36 is journaled in bearings 37 and 38 carried respectively by the end sections 32 and 33 of the casing. Both of the removable sections are slidably disposed upon the shafts 20 and 36 and either can be readily removed independently of the other.

The shaft 36 is driven by the shaft 20 through the medium of the spur gears 39 and 40 as clearly shown in Figure 6. Thrust bearings 41 are disposed on the shafts 20 and 36 between the gears 39 and 40 and the removable section 32 of the casing while similar thrust bearings 42 are provided for said shaft at the opposite side of casing, being disposed between the shoulder portions 43 thereof and the inwardly extending annular projections 44 of the casing section 33. The bearings 35 and 37 of the shafts 20 and 36 are disposed in outwardly extending annular projections 45 closed at their outer ends as shown in Figure 6. The shaft 20 at the point where it projects from the casing is provided with a suitable packing 46 secured by a retaining nut 47 in the usual manner.

The shafts 36 and 20 are provided respectively with right and left hand worms 48 and 49 adapted to mesh with worm wheels 50 and 51 loosely mounted on the transverse drive shaft 15, journaled in bearings 52 and 53 secured in the walls of the casings as shown in Figure 4. The projecting end of the shaft 15 is provided with a suitable packing 54 for preventing the escape of oil from the casing, said packing being held by a retaining ring 55 surrounding the shaft as shown in Figure 4. Escape of oil from the casing through the bearing 52 is prevented by a closure member 56 at the outer end of the bearing.

A clutch is provided between the worm wheels 50 and 51 for coupling either of them with the drive shaft 15 at will. The clutch preferably comprises a grooved slide block 57 slotted to receive a key 58 fixed in a bushing 59 rigidly secured upon the shaft 15 by suitable pins 60, as shown in Figure 4. The slidable clutch member is provided at its opposite sides with projecting clutch pins 61 and 62 adapted to take into recesses 63 and 64 formed respectively in the worm wheels 50 and 51. The recesses are made considerably larger than the pins to facilitate operation of the clutch. The clutch shifting means preferably comprises a pair of arms 65 rigid on a rock shaft 66, the arms having lateral projections 67 disposed in the groove of the clutch block in the usual manner. The shaft 66 is journaled in suitable bearings formed in the upper part of the transmission casing, said shaft being operated by a handle 68 shown in Figures 3 and 8.

The casing is supplied with oil through a fitting 69 provided with a removable closure 70.

In the operation of the transmission mechanism the worm shaft 20 is driven constantly by the motor shaft 18 while the motor is running and likewise the shaft 36, which is geared to the shaft 20. Furthermore the worm wheels 50 and 51 are also continuously driven since they are constantly in mesh with the worms 48 and 49. The worm 48 being a right hand worm and 49 being a left hand worm both worm wheels will be driven in the same direction and either, when coupled with the drive shaft 15, will operate the latter and thus drive the impeller shaft 12 and the impeller thereon. In order to provide two different speeds for the impeller shaft the threads of the worm 49 are given a different pitch from those of the worm 48, being preferably a double thread or one having twice the pitch of the thread 48. Therefore when the clutch is in engagement with the worm 51 the impeller drive shaft 15 will be driven at twice the speed at which it is driven when the clutch is in engagement with the worm wheel 50. Thus a two speed transmission is provided through the use of parallel worm drives and one in which the speeds can readily be changed while the machine is in operation.

With the ordinary type of gear transmission, from a relatively high motor speed down to a low operating speed, it is very difficult to enclose the gearing in an oil casing but in the present construction all moving parts except the projecting shafts are wholly enclosed in a bath of oil, thereby insuring a silent transmission and increasing its life through constant lubrication of the parts. The compactness of the present construction materially reduces its weight and enables greater power to be transmitted through a smaller machine. A variety of speeds are also afforded by changing either the proportions of the spur gears on the parallel worm shafts or changing the pitch of the worms, which can be readily done by removing one set of gears and substituting another. The design also lends itself to any proportional increase or decrease in power by changing the size of the unit proportionally.

In the processing of liquids in practically all industries the required speed of agitation at one stage is seldom the same as that at another and in either case the speed of the impeller should be relatively low, compared to that of the motor used to drive the impeller as has been provided for in the construction described herein. The present transmission is comparatively inexpensive to manufacture and is practically noiseless and highly efficient in operation and affords a very satisfactory means for delivering power to the agitator at the several speeds required under different operating conditions.

We claim as our invention:

1. In a transmission drive mechanism, a casing including oppositely positioned removable sections, a pair of shafts journaled in said removable sections and having intermeshing gears, one of the shafts being adapted for connection with a power unit, right and left hand worms secured upon said shafts having threads of a different pitch, a third shaft extending transversely to said first mentioned shafts and having loosely mounted constantly driven worm wheels thereon meshing with said worms, and a clutch disposed upon said transverse shaft between said worm wheels and movable to couple either of them with said transverse shaft whereby to drive the latter at different speeds.

2. In a transmission drive mechanism, the combination with a casing, of a shaft journalled therein, a pair of worm wheels loosely mounted on said shaft, a pair of shafts within said casing extending transversely of said first shaft, said casing having openings closed by oppositely positioned sections removable independently of said first shaft and said pair of shafts being journalled in said removable sections, a right hand worm on one of the shafts of said pair meshing with one of said worm wheels, a left hand worm on the other of the shafts of said pair meshing with the other of said worm wheels, said worms being of different pitches, intermeshing gears on said pair of shafts so that rotation of one shaft in one direction causes rotation of the other shaft in the opposite direction, said openings in said casing being larger than the diameters of said intermeshing gears so that said pair of shafts, worms, and gears may be removed bodily through said openings when said sections are removed, and a clutch member slidable on said first shaft between said worm wheels to connect either of the worm wheels selectively with the shaft, so that the shaft may be driven selectively at either of two speeds in the same direction.

MILTON W. ELMENDORF.
EDGAR B. NICHOLS.